Figure 1:
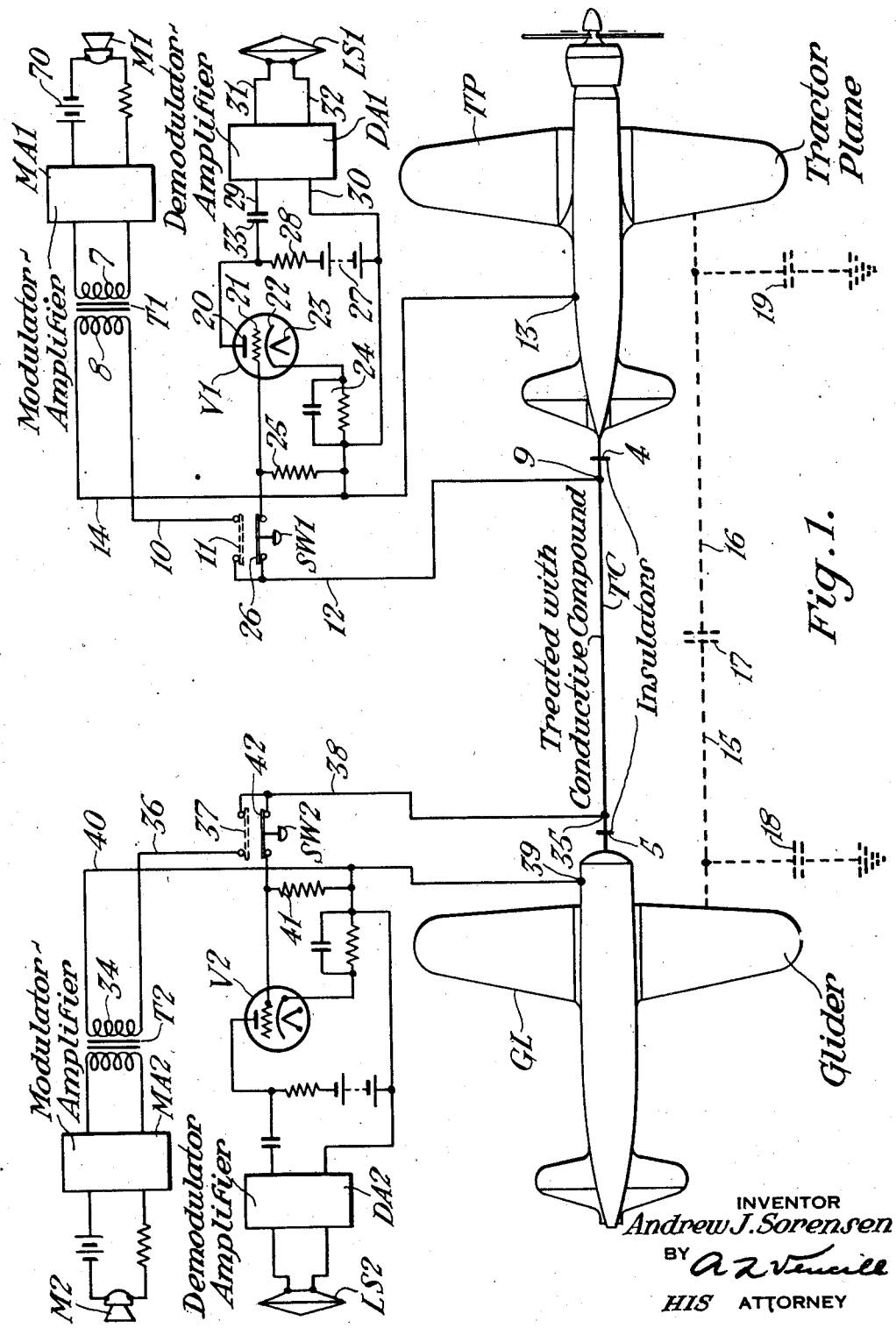

Sept. 23, 1947.   A. J. SORENSEN   2,427,979
COMMUNICATION AND CONTROL SYSTEM FOR AIRPLANES
Filed Sept. 4, 1943   2 Sheets-Sheet 1

INVENTOR
Andrew J. Sorensen.
BY
HIS ATTORNEY

Sept. 23, 1947.  A. J. SORENSEN  2,427,979
COMMUNICATION AND CONTROL SYSTEM FOR AIRPLANES
Filed Sept. 4, 1943  2 Sheets-Sheet 2

INVENTOR
Andrew J. Sorensen.
BY
HIS ATTORNEY

Patented Sept. 23, 1947

2,427,979

UNITED STATES PATENT OFFICE 2,427,979

COMMUNICATION AND CONTROL SYSTEM FOR AIRPLANES

Andrew J. Sorensen, Edgewood, Pa., assignor to The Union Switch & Signal Company, Swissvale, Pa., a corporation of Pennsylvania Application September 4, 1943, Serial No. 501,274

2 Claims. (Cl. 244—3)

My invention relates to communication and control systems for air planes, and more particularly to apparatus for control and communication systems for tractor planes and gliders.

When gliders or motorless planes are pulled by a tractor or tow plane, the glider pilot has difficulty in maintaining proper direction and position relative to the tractor plane in taking off and landing, and also during periods of low visibility while in flight. If proper direction and position of a glider is not maintained, then there is the possibility that the glider may cause the tractor plane to stall and cause a forced landing of both planes. When two or three gliders are towed by a single tractor plane these conditions become more acute. An intercommunication and control system installed between the tractor plane and the glider would aid greatly the pilots in keeping the planes in proper relative positions and direction. If an "automatic pilot" is used on a glider, a reliable control system by which the tractor plane pilot controls the glider is required.

Accordingly, a feature of my invention is the provision of novel and improved apparatus for communication and control systems for air planes.

Another feature of my invention is the provision of novel and improved apparatus for communication and control systems for tractor plane and gliders pulled thereby and wherewith privacy of communication and reliability of control are effected.

Again, a feature of my invention is the provision of novel means for communication and control between a tractor plane and a glider through the towing cable.

Still another feature of my invention is the provision of novel apparatus for a pilot of a tractor plane to automatically establish different controls for one or more gliders being towed by that tractor plane.

Other features, objects and advantages of my invention will appear as the specification progresses.

The above features, objects and advantages of my invention I accomplish by providing communication and control apparatus that is mounted partly on each plane, and forming a circuit between the two portions of the apparatus through the towing cable and the capacitance between the metal portions of the two planes. A towing cable must be capable of expanding and contracting its length some thirty per cent or more because of the nature of the task, and for this reason the cable is made usually of nylon and other elastic material which are electrically non-conductive. To provide the cable with electric conductive properties, I impregnate or otherwise treat the cable with some suitable compound, such as, for example, "aquadag." A few pounds of such fine carbon particles found in "aquadag" will make such a cable of the length of 500 feet, which has been found suitable for towing gliders by tractor planes, conductive to the extent that its resistance is of the order of 10,000 ohms. In other words, the towing cable is treated to provide within reasonable limits conductive properties of a predetermined value. This treatment of a cable may be effected either during the manufacturing process and its conductivity made substantially uniform over its entire length, or it may be treated after it has been cut to proper length and the treatment confined to a preselected portion between the two connections to the planes, leaving a short non-conductive length of cable adjacent each plane, which short length will serve as an insulator between the plane and the conductive portion of the cable. When the entire cable is treated, then insulators of the strain insulator type are inserted in the cable, one adjacent its connection to each plane. In either case the body of each plane is electrically insulated from the intermediate treated portion of the towing cable.

The metal bodies and other metal portions of the two planes form a condenser the dielectric of which is the air space between the planes. Also, the metal body of each plane is one plate of a condenser, the other plate of which is the earth.

Thus with the towing cable treated as explained above and insulated from the bodies of the planes, a transmitting circuit is formed between the two planes, one side of such circuit including the treated portion of the towing cable, and the other side including the capacitance between the metallic portions of the planes in multiple with the capacitance between the metallic portion of each plane and earth and the ground path.

The communication and control apparatus is connected to this transmitting circuit by the portion on each plane being connected between a terminal secured to the treated portion of the towing cable outside of the adjacent insulator, and a terminal formed on the metal portion of the respective plane.

The apparatus for communication and control includes transmitters and receivers, a transmitter mounted on one plane cooperating with a receiver on the other plane. Each such transmitter includes a source of carrier wave and means to modulate such carrier by a modulating wave, and each receiver includes a demodulator of such modulated carrier and means responsive to the modulating wave. I propose to use a carrier wave of the frequency of the order of 10,000 cycles per second or less so that it is substantially free from electromagnetic radiation but is effective for electrostatic induction. Consequently, when a transmitter on one plane and the receiver on the other plane are connected to this transmitting circuit formed between the two planes, energy is transferred between the two portions of the apparatus, that is, between the transmitter and the receiver, due to the conductive properties provided for the towing cable and the capacitance between the metallic portions of the planes and the capacitance between the metallic portion of each plane and earth. In other words, a transfer of energy between a transmitter and a receiver takes place because of the potential difference that is created between the metallic portions of the planes. In case either plane is constructed of non-metallic material, such as plywood, I insert a thin metal sheet in the wings or in some other suitable part of the plane and connect the transmitting circuit to this plate. For communication, the carrier wave is modulated by a voice current, and the receiver includes a loud speaker or some other form of telephone receiver. For control the carrier is modulated by different preselected frequencies an individual frequency being used for each control. For two-way communication and control each plane is provided with a transmitter and a receiver, together with switching means for connecting either the transmitter or the receiver of a plane to the transmitting circuit. When more than one glider is being towed, the apparatus on the tractor plane is connected to the cables to the different gliders in multiple, and all the pilots are in communication with the tractor plane pilot and orders can be given to keep the proper relative positions of the planes with respect to each other and with respect to the tractor plane. Normally each apparatus is connected to the transmitting circuit in a receiving condition, and communication can be initated by any one of the pilots. If communication and control are both provided, each equipment is provided with switching means having different positions to selectively connect the respective portion of the apparatus at its different control and communication conditions to the transmitting circuit.

I shall describe two forms of apparatus embodying my invention, and shall then point out the novel features thereof in claims.

Figure 2:
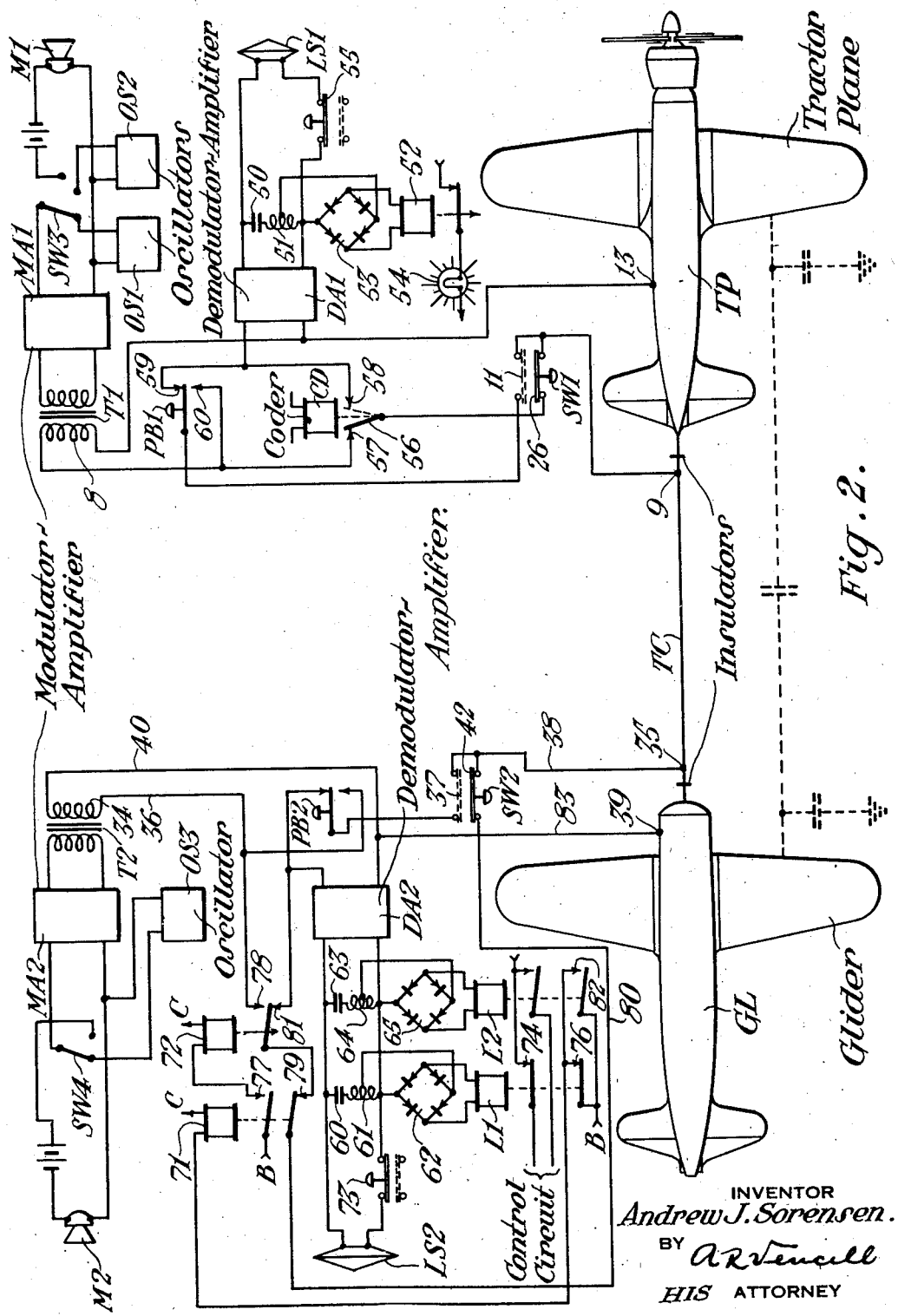

In the accompanying drawings, Fig. 1 is a diagrammatic view showing one form of apparatus embodying my invention when used for telephone communication between a tractor plane and a glider. Fig. 2 is a diagrammatic view showing a form of apparatus embodying my invention when used for a combined control and telephone communication between a tractor plane and a glider.

In each of the two views, like reference characters are used to designate similar parts.

Referring to Fig. 1, the reference characters TP and GL designate a tractor plane and a glider, respectively, the tractor plane TP pulling glider GL through a towing cable TC connected to each plane in any suitable manner. This towing cable TC would be of suitable size and length and a length of 500 feet has been proposed. The cable is, ordinarily at least, made from nylon or other synthetic material because it must be capable of expanding and contracting in length some thirty per cent or more. Since such material makes the cable electrically non-conductive, the cable TC is treated with a conductive compound, such as, for example, "aquadag" either during the manufacturing of the cable or after the cable has been prepared ready for connection to the planes. By such treatment the cable is made to have a conductive property and a length of the order of 500 feet may have a resistance of the order of 10,000 ohms. Assuming that the cable TC has been treated throughout its entire length, two insulators 4 and 5 are interposed in the cable adjacent its connection to the planes TP and GL, respectively. In case the cable is treated after it has been made ready for connection to the plane, then a short length of the cable adjacent each plane may be left untreated, and the insulators 4 and 5 may not be required because the untreated portion of the cable would serve as an insulator. The metallic bodies and other metallic portions of the planes form the plates of a condenser the dielectric of which is the air space between these two planes. In order to visualize such capacitance dotted lines 15 and 16 and a condenser 17 are added to the drawing, although they represent no additional physical apparatus. Also, the metallic body and other parts of each plane form one plate of a condenser of which the other plate is the earth and the dielectric is the air space. To visualize such capacitance dotted line condensers 18 and 19, together with respective dotted line connections, have been added to the drawing, but it is to be understood that these condensers and connections represent no additional physical apparatus. It is clear that a circuit is formed between the two planes and of which circuit the treated portion of the cable TC intermediate insulators 4 and 5 forms one side of the circuit and the capacitance represented by condenser 17 in multiple with the capacitance represented by condensers 18 and 19 and the ground path forms the other side of the circuit. As stated hereinbefore, if either plane is made of non-metallic material, then a light metal sheet would be inserted in the plane wing or some other suitable part.

Planes TP and GL are provided with communication apparatus mounted partly on each plane. In Fig. 1, two-way communication is contemplated and the two portions of the apparatus are duplications and each includes a transmitter and a receiver.

Looking at plane TP, the transmitter includes a modulator-amplifier MAI, a microphone MI, and an output transformer TI. The modulator-amplifier MAI may be any one of several well-known forms, and is shown conventionally since the construction of this device forms no part of my invention. For example, the modulator-amplifier may be similar to that covered in Letters Patent of the United States No. 2,287,655, granted June 23, 1942, to L. D. Whitelock et al., for Transmitting apparatus for communication systems. It is sufficient for a full understanding of my invention to point out that within the modulator MAI, a carrier wave is generated and modulated by a voice current created by speaking into the microphone MI, microphone MI being connected to the modulator through a battery 70. After modulation such carrier telephone current is amplified to the desired energy level and current is made to flow in primary winding 7 of output transformer T1 to induce a corresponding electromotive force in secondary winding 8 of that transformer. Secondary winding 8 of transformer T1 is connected to the transmitting circuit extending between the two planes by one terminal of winding 8 being connected to a terminal 9 secured to the towing cable TC through wire 10, normally open contact 11 of a manually operable switch SW1 and wire 12; and the other terminal of winding 8 being connected to a terminal 13 formed in the metal portion of the body of the plane TP through wire 14. It follows that when switch SW1 is operated to the dotted line position closing contact 11, the carrier telephone current created through the modulator-amplifier MA1 is impressed between the terminals 9 and 13 of the transmitting circuit, that is, a corresponding potential is created between the conductive portion of the towing cable and the metal part of the plane.

The receiver of the apparatus on plane TP includes a first stage amplifier tube V1, a demodulator-amplifier DA1 and a loud speaker LS1. The tube V1 may be of any suitable type of electron tube, and in Fig. 1 it is an indirectly heated tube having an anode 20, a control grid 21, a cathode 22 and a filament 23, the filament 23 being constantly heated in any suitable arrangement. A grid circuit for tube V1 includes a bias unit 24 and a resistor 25, the resistor 25 having connections between terminal 9 of cable TC and terminal 13 formed in the body of the plane through a normally closed contact 26 of switch SW1 as will be apparent by an inspection of the drawing. The anode circuit includes a battery 27 and a resistor 28. It is clear that if a carrier telephone current, such as, for example, that supplied by the associated transmitter of plane TP be made to appear across terminals 9 and 13 of the transmitting circuit while contact 26 of switch SW1 is closed, such current is impressed on the grid circuit of the tube V1 and made to appear in the anode circuit of that tube in an amplified form.

The demodulator-amplifier DA1 may be of any one of several well-known arrangements, and is shown conventionally for the sake of simplicity. This device may be similar to the balance type covered by Letters Patent of the United States No. 2,129,313, granted September 6, 1938, to L. D. Whitelock, for Apparatus for electric signaling system. It is sufficient for this application to point out that a carrier wave generated within the demodulator is mixed with the incoming carrier telephone current applied to the input side of the device through wires 29 and 30 and a voice current is supplied to the loud speaker LS connected to the output side of the demodulator-amplifier DA1 through wires 31 and 32. The input side of the demodulator is coupled to the anode circuit of the tube V1 through a condenser 33, and consequently, the speech of a carrier telephone current appearing at terminals 9 and 13 of the transmitting circuit is reproduced at the loud speaker LS1

That portion of the apparatus mounted on the glider GL includes a transmitter and a receiver which are substantially the same as the corresponding devices of the tractor plane, and further description is not required except to point out that the glider transmitter includes a microphone M2, a modulator-amplifier MA2 and an output transformer T2; and the glider receiver includes a first stage amplifying tube V2, a demodulator-amplifier DA2 and a loud speaker LS2. Also, secondary winding 34 of output transformer T2 is connected to the transmitting circuit by one terminal of winding 34 being connected to terminal 35 formed on the towing cable through wire 36, normally open contact 37 of a manually operable switch SW2 and wire 38; and its other terminal being connected to terminal 39 formed on the metal body of glider GL through wire 40. Furthermore, resistor 41 included in the grid circuit for tube V2 is connected across terminals 35 and 39 through a normally closed contact 42 of switch SW2, as will be apparent on an inspective of the drawing.

Normally, that is, when the two switches SW1 and SW2 are set at the positions illustrated by the solid lines in Fig. 1, the receiver of each plane is connected to the transmitting circuit ready to receive a telephone message. If the operator of the tractor plane TP wishes to speak to the pilot of the glider GL, the procedure may be as follows: The tractor plane pilot moves switch SW1 to the dotted line position and speaks some designated calling phrase into the microphone M1. Such action causes a corresponding carrier telephone current to be impressed between terminals 9 and 13 of the transmitting circuit, and a corresponding electromotive force to appear between terminals 35 and 39 at the glider due to the transmitting circuit formed between the two planes. Such electromotive force appearing at terminals 35 and 39 is applied to tube V2 and thence to the demodulator-amplifier and after demodulation the calling phrase is sounded at loud speaker LS2. After sending such calling phrases the tractor plane pilot would place switch SW1 at its normal position. Upon receipt of such calling phrase the glider pilot would move his switch SW2 to the dotted line position and repeat an agreed acknowledging phrase into his microphone M2. This acknowledging phrase modulates the carrier at the modulator-amplifier MA2 and a corresponding carrier telephone current is impressed across terminals 35 and 39 of the transmitting circuit, and in turn a corresponding electromotive force is made to appear at terminals 9 and 13, which electromotive force is now applied to tube V1 and in turn to the demodulator-amplifier DA1 with the result that the acknowledging phrase is sounded at loud speaker LS1. From this point on the two pilots would carry on a conversation back and forth by proper positioning of their switches SW1 and SW2.

It is apparent that if the glider pilot desires to initiate communication, the procedure of sending a calling phrase to the tractor plane pilot to be sounded at loud speaker LS1, the sending of a return acknowledging phrase to be sounded at loud speaker LS2 and then the subsequent carrying on of the conversation may be similar to that just described when communication was initiated by the tractor plane pilot.

In Fig. 2, the tractor TP and glider GL are connected by a transmitting circuit the same as that of Fig. 1. In Fig. 2, the apparatus mounted on the planes includes telephone equipment the same as in Fig. 1, and also control equipment wherewith the tractor plane pilot can automatically establish any one of a plurality of different control conditions on the glider, and wherewith a return indication is effected on the tractor plane to indicate that the control established on the glider is in force.

Looking at tractor plane TP of Fig. 2, its transmitter includes two oscillators OS1 and OS2 in addition to the microphone M1, modulator-amplifier MA1 and output transformer T1. These oscillators OS1 and OS2 may be of any suitable type, such as an electron tube oscillator and are shown conventionally for the sake of simplicity. It is sufficient for this application to point out that oscillators OS1 and OS2 supply current of a preselected frequency, and by way of illustration I shall assume that oscillators OS1 and OS2 supply current of 40 and 50 cycles per second, respectively. Oscillators OS1 and OS2 and microphone M1 are selectively connected to the input side of modulator-amplifier MA1 through a manually operable switch SW3, which has three positions. With switch SW3 set at its left-hand position, that is, the position shown by the solid line in Fig. 2, oscillator OS1 is connected to the modulator-amplifier and the electromotive force thus induced in secondary winding 8 of the output transformer T1 is a carrier modulated at 40 cycles per second. With switch SW3 set at its mid position, the oscillator OS2 is included in the input circuit to the modulator-amplifier MA1 and the electromotive force appearing in secondary winding 8 of the output transformer is the carrier modulated at 50 cycles per second, and with the switch SW3 set at its right-hand position, the microphone M2 is included in the input circuit of the modulator-amplifier and a carrier telephone current appears in the output of the transformer T1.

The receiver of the tractor plane of Fig. 2 is the same as that of Fig. 1, with an indication means added. This indication means includes a tuned circuit comprising a condenser 50 and an inductance 51 connected in series across the output side of the demodulator-amplifier DA1, together with a relay 52 and an indicator lamp 54. This indication circuit 50—51 is tuned to resonance at some preselected frequency, such as, for example, 30 cycles per second, and the indication relay 52 is connected through a rectifier 53 to at least a portion of the inductance 51 and when energized the relay 52 controls a simple circuit for lamp 54.

The switching means for the apparatus of the tractor plane of Fig. 2, includes in addition to switches SW1 and SW3, a coder CD, a push button PB1 and another switch 55. The type of coder CD is immaterial, and a relay type is shown, the arrangement being such that as long as the winding of this coder is supplied with current by a source not shown, its contact member 56 is operated to alternately engage contacts 57 and 58 at a preselected code rate, such as, 75 times per minute. With the switch SW1 set at its normal position closing contact 26, the coder CD alternately connects the transmitter and receiver of the apparatus of the plane TP to the terminals 9 and 13 of the transmitting circuit, secondary winding 8 of output transformer T1 being connected to terminals 9 and 13 through coder contact 56—57, and the input side of the demodulator-amplifier DA1 being connected across the terminals 9 and 13 through coder contact 56—58. When switch SW1 is moved to its dotted line position, closing contact 11, then the transmitter and receiver are connected to the terminals 9 and 13 through the contacts of push button PB1, the secondary winding 8 of transformer T1 being connected to the terminals 9 and 13 through the normally open contact 60 of push button PB1 and the input side of the demodulator-amplifier DA1 being connected to the terminals 9 and 13 through the normally closed contact 59 of the push button.

The switch 55 is inserted in the connection of the loud speaker to the output side of the demodulator-amplifier, and it may be used to at times cut out the loud speaker.

The transmitter of glider GL of Fig. 2 includes an oscillator OS3 in addition to microphone M2, modulator-amplifier MA2 and output transformer T2. Oscillator OS3 is connected to the input side of the modulator through the normally closed left-hand position of a switch SW4 and the microphone M2 is connected to the modulator through the normally open right-hand position of switch SW4. Oscillator OS3 is an indication oscillator and on the assumption that the indication means of the tractor plane TP is tuned to resonance at 30 cycles per second, the oscillator OS3 supplies current of 30 cycles per second. Consequently, when switch SW4 is set at its left-hand position the oscillator OS3 is connected to the modulator and an indication current modulated at 30 cycles per second appears in the secondary winding 34 of the output transformer T2. With switch SW4 moved to its right-hand position, then a carrier telephone current is made to appear in the secondary winding 34 of the output transformer.

The receiver of the glider of Fig. 2 includes two control circuits and associated control relays in addition to the demodulator-amplifier DA2 and loud speaker LS2. One control circuit comprises a condenser 60 and an inductance 61, across at least a portion of which inductance a relay L1 is connected through a rectifier 62. Similarly a second control circuit includes a condenser 63 and an inductance 64, across at least a portion of which inductance a relay L2 is connected through a rectifier 65. These control circuits are connected in multiple across the output of the demodulator and are tuned to the frequencies of the oscillators OS1 an OS2 of the transmitter of the tractor plane, the circuit including condenser 60 and inductance 61 being tuned to the frequency of 40 cycles per second and the circuit including condenser 63 and inductance 64 being tuned to resonance at 50 cycles per second. Relays L1 and L2 are used to govern different control devices, such as different positions of an automatic pilot of the glider plane.

The switching means of the glider of Fig. 2 includes two relays 71 and 72, a push button PB2 and another switch 73. This switching means will be best understood from a description of the operation of the apparatus.

Assuming the apparatus of Fig. 2 is set for control condition, the two switches SW1 and SW2 are placed so as to close contacts 26 and 42, respectively, and switches SW3 and SW4 are set at their left-hand positions, that is in the positions shown by the solid lines in the drawing. Under these circumstances, a control carrier current modulated at 40 cycles per second due to oscillator OS1 is impressed upon the terminals 9 and 13 of the transmitting circuit during the code period that contact 56—57 of coder CD is closed. A corresponding electromotive force appears at terminals 35 and 39 of the glider and such electromotive force is applied to the input side of the demodulator DA2 through a connection extending from terminal 35, wire 38, contact 42 of switch SW2, wire 80, back contacts 79 and 81 of relays 71 and 72, respectively, top right-hand terminal to lower right-hand terminal of demodulator DA2 and wire 83 to terminal 39. After demodulation a control current of 40 cycles is applied to the output side of the demodulator to energize relay L1 through its corresponding circuit, and with relay L1 energized to close its front contact 74, a preselected control circuit is closed. Loud speaker LS2 is also energized by this current to sound a corresponding tone unless the switch 73 is placed at its open position. At the end of the code period of coder CD and with contact 56—57 open, this control current is terminated, with the result that relay L1 is released. During the period relay L1 is picked up closing front contact 76, a simple circuit is formed for energizing relay 71 and that relay on picking up closes front contact 77 and relay 72 is energized by an obvious circuit including front contact 77. When relay L1 is released at the end of this code period, relay 71 is immediately released and relay 72 is deenergized, but relay 72 remains picked up for a period due to its slow release characteristic. During the period relay 71 is released and relay 72 is picked up, the secondary winding 34 of output transformer T2 is connected across terminals 35 and 39, the connection to terminal 39 being completed through wires 40 and 83, and to terminal 35 through wire 36, front contact 78 of relay 72, back contact 79 of relay 71, wire 80, contact 42 of switch SW2 and wire 38. Thus during this slow release period of relay 72, indication current is impressed across terminals 35 and 39 since oscillator OS3 is normally connected to the input side of the modulator-amplifier MA2. Coder CD has now closed contact 56—58 to connect the input side of demodulator-amplifier DA1 across terminals 9 and 13, and the indication current is supplied to the demodulator and current of 30 cycles per second appears in the ouput side to energize indication relay 52 and to cause the illumination of lamp 54. A corresponding tone would also be sounded at loud speaker LS1 unless the switch 55 has been moved to its open position.

In the event the switch SW3 is moved to its mid position so that oscillator OS2 is connected to the input side of the modulator MA1, a carrier current modulated at 50 cycles per second is applied to the transmitting circuit during the period coder contact 56—57 is closed, with the result the relay L2 of the glider is picked up to effect a corresponding control. With relay L2 picked up to close front contact 82, the switching relays 71 and 72 are energized in the manner explained when relay L1 is picked up with the result indication current is supplied to the transmitting circuit during the slow release period of relay 72, and since coder CD has operated to close the connection of the input side of the demodulator to the transmitting circuit, this indication current will bring about the illumination of lamp 54, the same as in the previous case.

In the case the tractor plane pilot wishes to telephone to the glider pilot, the tractor plane pilot would shift switch SW3 to its right-hand position to connect microphone M1 to the modulator, shift the switch SW1 to close contact 11, depress push button PB1 to close contact 60, and then speak a preselected calling phrase into the microphone M1. The discontinuing of the control current would cause the release of both relays 71 and 72 on the glider which in turn would connect the input side of the demodulator across terminals 35 and 39, the connection being completed through back contacts 79 and 81 of relays 71 and 72, respectively. The carrier telephone current would be applied to demodulator DA2 and the calling phrase would be reproduced at loud speaker LS2. The glider pilot would close switch 73 when the control current ceases to be received if switch 73 is not normally closed. The glider pilot upon receiving such a calling phrase would shift switch SW2 to close contact 31 and would shift switch SW4 to its right-hand position to connect the microphone M2 to the modulator and would then speak the designated answering phrase into his loud speaker. The corresponding carrier telephone current would be applied to the transmitting circuit. The tractor plane pilot would release in the meantime the push button PB1 so that the input side of demodulator DA1 is connected across terminals 9 and 13, and the answering phrase would be sounded at loud speaker LS1. From this point on the two pilots would carry on their conversation by proper operation of the push buttons PB1 and PB2. At the end of the telephone conversation each pilot would restore his switching means to its normal position so that the control condition would be reestablished.

In the event the control condition is in effect and the glider pilot wishes to initiate telephone communication, he would first shift switch SW4 to its right-hand position and discontinue the sending of indication current which would result in the release of the indication relay 52 and the extinguishing of the indication lamp 54 of the tractor plane. The extinguishing of lamp 54 would be an indication to the pilot of the tractor plane that he could expect telephone communication, and he would move his switch SW1 to close contact 11. Under such condition the telephone current created by the glider pilot speaking the calling phrase into microphone M2 would be applied to the demodulator DA1 on the tractor plane and reproduced at loud speaker LS1. After such calling phrase the tractor plane pilot would speak the designated acknowledging phrase into microphone M1. From this point the conversation would be carried on between the two pilots by the proper operation of the push buttons PB1 and PB2. It is to be observed that if in Fig. 2 a control condition only is required, then the telephone apparatus would be omitted. Also, if more than two control conditions are required, such can be provided by including additional oscillators in the transmitter at the tractor plane and including additional corresponding tuned circuits in the output of the demodulator of the glider.

It is to be noted that in Fig. 2, the first stage tubes V1 and V2 have been omitted but such tubes may be used if desired.

Also, it is to be understood that the frequencies recited for the carrier and for the control and indication oscillators are for illustration and other frequencies can be used.

Although I have herein shown and described but two forms of communication and control systems for air planes embodying my invention, it is understood that various changes and modifications may be made therein within the scope of the appended claims without departing from the spirit and scope of my invention.

Having thus described my invention, what I claim is:

1. In combination, a motorless plane attached to a motor plane by a towing cable, said cable formed of a non-conductive elastic material which permits stretching of the order of thirty per cent of the normal length of the cable to facilitate towing, electrical apparatus including equipment on each of said planes for control and communication between the planes, a substantial metallic portion of each plane insulated from the cable, an electrically conductive compound applied to said cable to impart a predetermined conductivity to the cable, and each said equipment connected to said insulated metallic portion of the plane on which the equipment is located and to said cable to electrically associate said equipments through a circuit including said cable and the capacitance between said metallic portions of the planes.

2. In combination, two air planes connected by a towing cable formed of non-conductive elastic material which permits a stretching of the order of one-third of its length, a conducting compound applied to said cable to impart a predetermined conductivity thereto, means to insulate the connection of said cable to each plane, an electrical apparatus including a source of oscillatory current and a receiver of such current located on each plane, and each of said electrical apparatuses connected to said towing cable and to a metal portion of the plane on which the apparatus is located to associate the two apparatuses due to the conductivity thus imparted to said towing cable and the electrostatic coupling between the metal portions of the planes.

ANDREW J. SORENSEN.

REFERENCES CITED

The following references are of record in the file of this patent:

UNITED STATES PATENTS

| Number | Name | Date |
|---|---|---|
| 1,926,968 | Causan | Sept. 12, 1933 |
| 1,690,578 | Hammond | Nov. 6, 1928 |
| 1,893,149 | Picco | Jan. 3, 1933 |
| 293,735 | Henderson | Feb. 19, 1884 |
| 1,043,526 | Lindal | Nov. 5, 1912 |
| 1,821,758 | Konn | Sept. 1, 1931 |
| 2,293,677 | Slayter | Aug. 18, 1942 |
| 2,322,773 | Peters | June 29, 1943 |
| 2,343,892 | Dodge et al. | Mar. 14, 1944 |
| 2,293,918 | Planiol | Aug. 25, 1942 |
| 514,460 | Hayward | Feb. 13, 1894 |

FOREIGN PATENTS

| Number | Country | Date |
|---|---|---|
| 547,481 | Great Britain | Aug. 28, 1942 |